July 7, 1925.　　　　　J. H. DILLON ET AL　　　　　1,545,131

TRANSFORMER COVER

Filed Jan. 16, 1925　　　　2 Sheets-Sheet 1

INVENTORS
Joseph H. Dillon,
Howard H. Fairweather
and Esrom L. Palmer:

BY R. S. A. Dougherty
and A. B. Reavis

ATTORNEYS

July 7, 1925.  1,545,131
J. H. DILLON ET AL
TRANSFORMER COVER
Filed Jan. 16, 1925  2 Sheets-Sheet 2
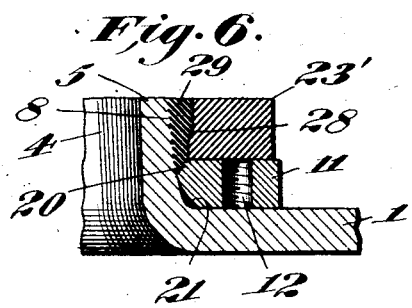
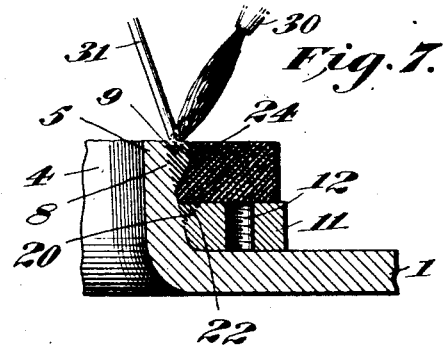
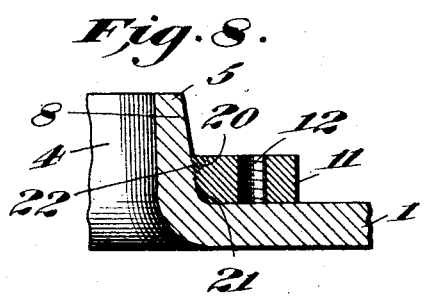
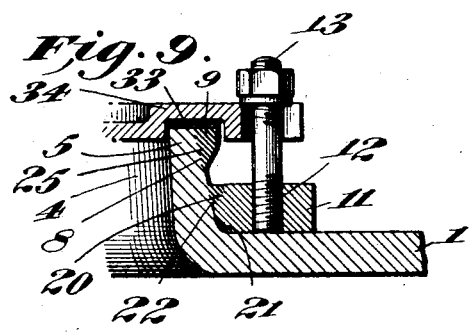
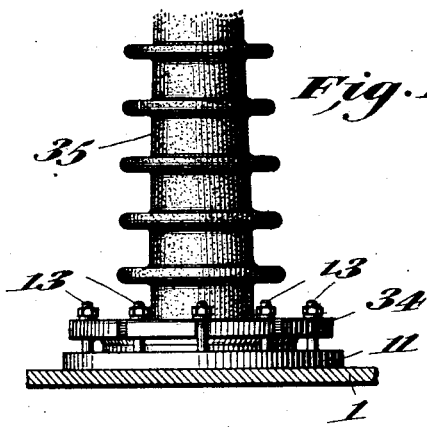
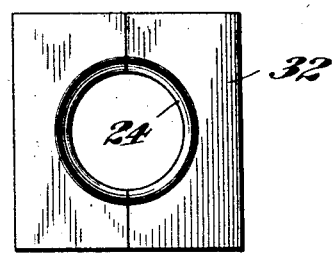
INVENTORS
Joseph H. Dillon,
Howard H. Fairweather
and Esrom L. Palmer.
ATTORNEYS Patented July 7, 1925.

1,545,131

UNITED STATES PATENT OFFICE.

JOSEPH H. DILLON, HOWARD H. FAIRWEATHER, AND ESROM L. PALMER, OF COATESVILLE, PENNSYLVANIA, ASSIGNORS TO BETHLEHEM STEEL COMPANY.

TRANSFORMER COVER.

Application filed January 16, 1925. Serial No. 2,869.

*To all whom it may concern:*

Be it known that we, JOSEPH H. DILLON, HOWARD H. FAIRWEATHER, and ESROM L. PALMER, citizens of the United States, and residents of Coatesville, Chester County, Pennsylvania, have invented certain new and useful Improvements in Transformer Covers, of which the following is a specification.

Our invention relates to the manufacture of transformer covers and similar articles.

One of the objects of our invention relates to the method of increasing the thickness by welding of the outer edges of the flanges around openings in large power transformer covers.

Another object of our invention is to secure the reinforcing rings which are attached to the transformer covers around the flanges of the openings.

A further object of our invention relates to the mold which is adapted to surround the outer edge of the flange which we reinforce by welding on a thickened portion.

Still another advantage of our invention resides in the fact that we can make transformer covers, by our method, of considerable thinner plates than heretofore.

Heretofore, in making large transformer covers of the type illustrated in the drawings, a rolled steel plate is used, which, for example, may be seven-eighths of an inch thick, twelve feet long and six feet wide. These plates are then heated and perforated at desired points with various sized holes. The reinforcing plates or rings are then placed around each perforation, the inner diameter of the openings of each reinforcing plate being somewhat greater than the diameter or size of the perforation in the plate for which it is intended. Flanges are then struck up from the plate around the edges of the perforations in the rolled plate and projected through the reinforcing plate and extending a short distance beyond the outer faces. The outer edges of these flanged openings are then surfaced by means of a milling tool or the like and are adapted to form seats for gaskets upon which the high voltage insulating bushings, etc., of the transformers are mounted and clamped in position by means of stud bolts which are threaded into holes in the reinforcing plates and pass through the base flange of the insulating bushing, with nuts on their upper ends as will be clearly understood by referring to Figs. 9 and 10 of the drawings. These reinforcing plates are placed in position around the perforations on the transformer cover when cold and when the flanges are struck up hot engage or bite into the outer facing of the flange and are thereby held in position. It often happens, however, that as the flanges cool they shrink away from the reinforcing plates leaving them loose. At other times the reinforcing plate becomes distorted or buckles and has to be straightened and to obviate these difficulties forms one of the objects of our invention.

Another difficulty found in striking up flanges around small holes or angular corners is that the outer edge of the flange stretches to such an extent that it is often found to be too thin to form a seat for a gasket and to increase the thickness of these thin edges of the flanges forms another object of our invention.

Having thus given a general description of our invention, we will now, in order to make the matter more clear, refer to the annexed two sheets of drawings which form a part of this specification and in which like characters of reference indicate like parts and in which:—

Fig. 6 is a transverse section on a somewhat larger scale showing a modification;

Fig. 7 illustrates another modification in which we use an oxy-acetylene torch for welding instead of an electric arc;

Fig. 8 is a detail view showing the manner of welding the reinforcing plate to the flange of one of the openings in the transformer cover;

Fig. 9 is a detail view illustrating the position of the gasket seated on the top edge of one of the reinforced flanges around the openings in the transformer cover;

Fig. 10 illustrates the manner of attaching one of the high voltage insulating bushings to the transformer cover; and Fig. 11 is a modified form of mold of rectangular outline.

Figure 1:
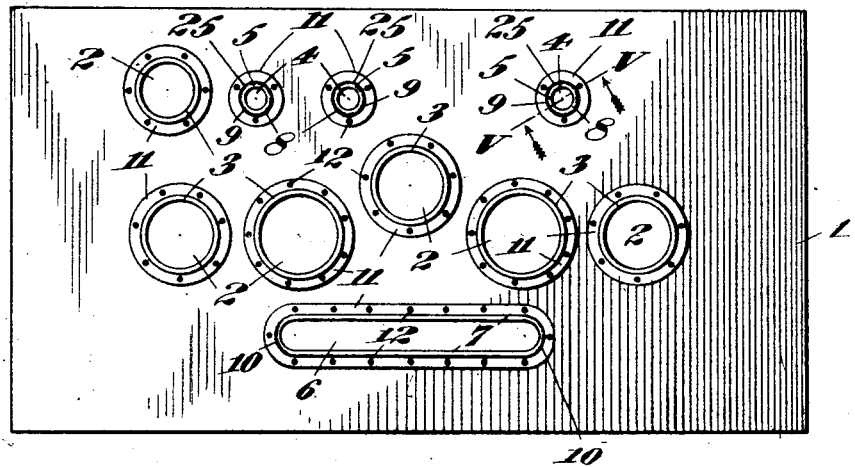
Fig. 1 is a top plan view of a large power transformer cover.
Figure 2:
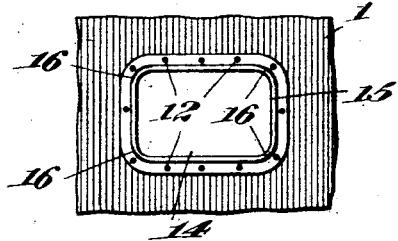
Fig. 2 is a detail view showing a rectangular opening in a transformer cover with the corners reinforced.
Figure 3:
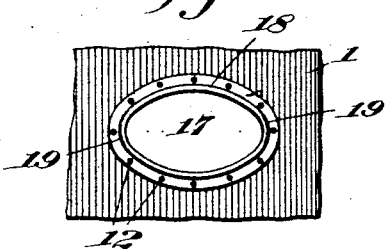
Fig. 3 is a detail view of an oval shaped opening in the transformer cover showing each end reinforced.

The numeral 1 indicates a large power transformer cover which has a plurality of large annular openings 2 with flanges surrounding the same as at 3. 4 represents smaller openings surrounded by flanges 5, and 6 represents elongated openings surrounded by flange 7. The flanges 5, at their outer edges 8, are reinforced as at 9 and the elongated flange 7 is reinforced as at 10. The flanges 3, 5 and 7 are each surrounded by a reinforcing plate 11 having screw threaded openings 12 for receiving stud bolts 13. In Fig. 2 we show a rectangular opening in the transformer cover, as at 14, surrounded by a flange 16 having reinforced corners 16'. In Fig. 3, is shown an oval opening 17 surrounded by a flange 18 which is reinforced as at 19.

The reinforcing plates 11 have their inner faces bevelled at the top and bottom, as at 20 and 21, respectively, the bevelled portion 21 being sufficient to clear the radius on the outside face near the base of the flange around the opening and the top bevel 20 is adapted to be filled with fused metal as at 22, and form a welded joint between the side of the flanged openings in the transformer cover plate 1 and the reinforcing plate 11.

Referring now more particularly to Figs. 1, 4, 5, 8, 9 and 10, the plate 1 having been perforated with holes and flanges having been struck up around the edges of the perforations in the usual manner well known in the art, the reinforcing plates 11 having been placed in position and welded to the flanges around the openings, the outer edges of the flanges around the smaller annular openings or the corners of rectangular openings or the like, stretch and become so thin during the flanging operation, unless the plate is made of very thick metal, that they have to be reinforced to have the desired thickness to form a good gasket seat.

Figure 4:
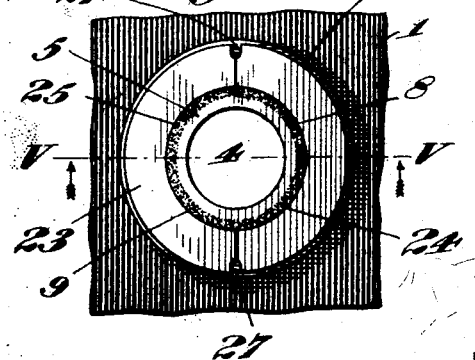
Fig. 4 is a top plan view of one of the small openings on an enlarged scale showing the flange around one of the small transformer cover openings after it has been reinforced by welding with an annular mold in position.
Figure 5:
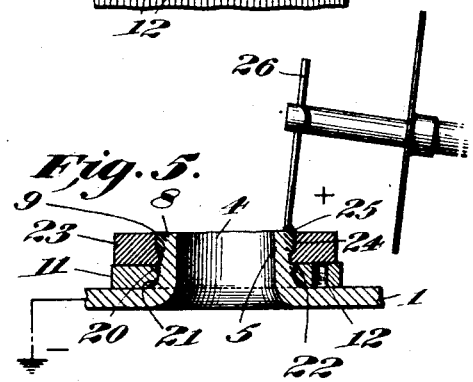
Fig. 5 is a transverse sectional view taken on the line V—V of Figs. 1 and 4, showing the application of my invention at the end of the welding operation.

In Figs. 4 and 5, we have illustrated one method of reinforcing thin flanged edges 5 around one of the small annular openings 4 by means of arc welding. We first place on top of the reinforcing plate 11 a mold or form 23 preferably made of copper which may be made in sections when required, with a groove or space 24 between the outer edge of the flange to be thickened and the inside of the mold. This groove is then filled with fused metal 25 by means of arc welding. The positive electrode 26 is preferably made of mild steel which before use is dipped in lime wash so that the metal will flow more evenly when melted by the arc of the electrode, will be quickly fused and unite to form a perfect weld on the side near the top edge of the thin flange around the opening, but will not weld or adhere to the copper mold which can be detached by inserting a tool in the notches 27 thereby spreading the sections of the mold apart and can be used over again for other similar operations.

In Fig. 6, we have shown a slightly modified form in which the copper mold 23 is made with a groove 28 between the flange around the opening and the inside of the mold extending down to the reinforcing plate 11 so that the 20 of the reinforcing plate 11 so that the added fused metal 29 secures the reinforcing plate 11 in position at the same time the edge is thickened.

In Fig. 7, we have illustrated how our method may be accomplished by means of an oxy-acetylene torch 30 for fusing the metal bar or rod 31 to fill the groove or space 24 and weld the reinforcing plate 11 in position. When using an oxy-acetylene torch, however, the excess heat would melt a copper mold so that in this case we prefer to use a mold of refractory material, such as graphite. In this figure, we have also made the lower inner face of the reinforcing plate 11 as conforming to contour of the outside of the base of the flange around the opening 4.

In Fig. 11, we show a mold 32 of rectangular outline which in some cases we prefer to use instead of the annular mold shown in Fig. 4, as it can be more easily placed in position and detached from the finished weld when desired.

After the thin edges of the flanges around the opening are thickened by welding, the edge of the flange is then surfaced to form a bearing seat for the gasket 33 upon which the base flange 34 of the high voltage insulating bushings 35 are mounted and secured in position by means of the stud bolts 13 as shown in Figs. 9 and 10.

Although we have shown our invention as applied to annular or arc shaped flanges, we do not wish to be limited to such as it can be applied to angular corners or straight flanges equally as well, nor do we wish to be limited to its use on transformer covers alone as it is equally applicable to flanged openings of other devices.

From the foregoing, it will be apparent that we have provided a method and means for thickening the outer end portions of drawn flanges of flanged openings in metallic plate material. This reinforcement or increase in radial thickness of the outer end portions of such flanges is carried out by welding metallic material externally of the outer end portions of such flanges, a mold of suitable material, for example copper, being arranged about the flange so as to properly shape the fused metal which is welded to the flange. We have discovered that copper serves well for this purpose for the reason that there is no tendency for the fused metal to weld to or coalesce with the copper. Possibly the excellence of copper for a mold of this type is due to the fact that copper has a high rate of conductivity for heat, whereby the fused material is both molded and the heat is very rapidly conducted away therefrom. While copper is the best material in so far as we are aware for molds to be used where the additional metal is electrowelded to a flange, it does not serve so well where the process of acetylene welding is used on account of the likelihood of fusion of the copper. Hence, where the latter type of welding is to be used, we prefer to make the mold of a highly refractory substance, for example graphite. In accordance with our invention, therefore, the problem of providing a mold which shall cope with the heat involved in welding material to a flange in this way is met either by providing a mold having high conductivity for heat or a mold which is of a highly refractory character. With either type of mold, there should be no fusion of the mold and no welding of the metal of the weld to the mold.

Although we have shown and described our invention in considerable detail, we do not wish to be limited to the exact and specific details thereof as shown and described, but may use such modifications in, substitutions for, or equivalents thereof, as are embraced within the scope of our invention as pointed out in the claims.

Have thus described the invention, what we claim as new and desire to secure by Letters Patent is:—

1. As an article of manufacture, a rolled metal plate having an opening surrounded by a struck-up flange which is thickened at its outer end by having extra metal welded thereto.

2. As an article of manufacture, a rolled metal plate having an opening surrounded by a struck-up flange which is thickened at its outer end by having extra metal welded around the flange.

3. The combination of a rolled metal receptacle cover formed with an opening surrounded by a struck-up flange and having metal welded to the outer end of the flange to provide a seat of suitable thickness and means having a seat portion for cooperation with said seat.

4. The combination of a rolled metal receptacle cover formed with an opening surrounded by a struck-up flange and having metal welded around the outer end of the flange to provide a seat of suitable thickness, a member secured to the cover and having a seat opposed to the first seat, and gasket means between the seats.

5. As an article of manufacture a metallic plate having flanged openings therein and the outer end portions of said openings having metal welded thereto to strengthen and to increase the thickness of the outer end portions of the flanges.

6. As an article of manufacture, the combination of a rolled metal plate provided with an opening surrounded by a struck-up flange, an attachment member secured in place with respect to the plate and having an opening which surrounds the flange, the outer end of said flange having extra metal welded thereabout to provide a seat of suitable thickness, and means secured to the attachment member and fitting said seat.

7. As an article of manufacture, the combination of a metallic plate member having a flanged opening, an attachment member surrounding the flange, and a metallic weld surrounding the flange, joining the attachment member to the flange, and serving to strengthen and to increase the thickness of the outer portion of said flange.

8. As an article of manufacture, the combination of a metallic plate having a flanged opening, an attachment member surrounding the flange and having threaded openings formed therein, a metallic weld for joining the attachment member to the flange, and a metallic weld disposed about and joined to the outer portion of the flange for strengthening and for increasing the thickness of the latter.

9. As an article of manufacture, a transformer cover made of plate metal and having flanged openings therein to receive insulated electrodes having flanges, attachment members surrounding the flanges, welds for connecting the attachment members to the flanges, welds joined to the outer portions of the flanges to reinforce the latter and to increase the thickness thereof to provide proper bearing surface for gaskets between the latter and flanges of the electrodes, and means carried by the attachment member for maintaining the flanges of the insulated electrodes and the outer thickened flange portions in tight relation with respect to interposed gaskets.

In testimony whereof we hereunto affix our signatures this 12th day of January, 1925.

JOSEPH H. DILLON.
HOWARD H. FAIRWEATHER.
ESROM L. PALMER.